United States Patent [19]
Deutsch

[11] Patent Number: 4,599,695
[45] Date of Patent: Jul. 8, 1986

[54] MICROPROCESSOR TRANSIENT INTERRUPT SYSTEM ADAPTABLE FOR ENGINE CONTROL

[75] Inventor: Robert Deutsch, Sugar Grove, Ill.

[73] Assignee: Motorola, Inc., Schaumburg, Ill.

[21] Appl. No.: 614,352

[22] Filed: May 25, 1984

[51] Int. Cl.[4] .................. G06F 9/46; F02D 41/28; F02P 5/15
[52] U.S. Cl. .................... 364/431.11; 364/431.07; 123/325; 123/422; 123/491
[58] Field of Search .................. 364/431.05, 431.06, 364/431.07, 431.11; 123/325, 357, 370, 371, 422, 423, 491, 492

[56] References Cited
U.S. PATENT DOCUMENTS

| | | | |
|---|---|---|---|
| 4,032,757 | 6/1977 | Eccles | 364/431.11 X |
| 4,174,694 | 11/1979 | Wessel et al. | 123/340 X |
| 4,186,691 | 2/1980 | Takase et al. | 123/325 |
| 4,244,023 | 1/1981 | Johnson | 364/431.07 |
| 4,282,573 | 8/1981 | Imai et al. | 364/431.11 |
| 4,352,157 | 9/1982 | Namimoto et al. | 364/431.11 X |
| 4,355,360 | 10/1982 | Asano et al. | 364/431.11 |
| 4,363,097 | 12/1982 | Amano et al. | 364/431.11 |
| 4,410,938 | 10/1983 | Higashiyama | 364/431.11 X |
| 4,482,962 | 11/1984 | Amano et al. | 364/431.11 |
| 4,490,792 | 12/1984 | Deutsch et al. | 364/431.07 |

Primary Examiner—Felix D. Gruber
Attorney, Agent, or Firm—Phillip H. Melamed

[57] ABSTRACT

An engine control microprocessor transient interrupt system is provided wherein an engine throttle position sensor provides a throttle position input signal to a microprocessor which developes engine control output signals in response thereto. The throttle position sensor also provides an input signal to a transient detector external to the microprocessor which provides an interrupt signal to the microprocessor in response to the rate of change of throttle position exceeding a threshold. In response to the interrupt signal, the microprocessor provides a disable signal which disables the external transient detector, and then the microprocessor monitors the rate of change of engine throttle position to determine the end of the throttle position transient condition and enables the external transient detector in response to the end of the transient condition.

20 Claims, 4 Drawing Figures

MICROPROCESSOR TRANSIENT INTERRUPT SYSTEM ADAPTABLE FOR ENGINE CONTROL

BACKGROUND OF THE INVENTION

The present invention relates to the field of microprocessor transient interrupt systems, and more particularly to an engine control system which utilizes a microprocessor transient interrupt system.

Many known engine control systems utilize a microprocessor to provide engine control output signals in response to the receipt of engine parameter input signals which typically include a signal related to engine throttle position. Typically, the engine control output signals are utilized to determine the amount of fuel and air delivered to engine cylinders of an internal combustion engine as well as determining the proper occurrence of engine spark and dwell with respect to proper rotational positions of the engine crankshaft. Such systems typically recognize that it is necessary to rapidly determine the existence of an acceleration transient condition and, in response thereto, appropriately modify the engine output control signals. To accomplish this, some prior systems have utilized an acceleration transient detector circuit external to the microprocessor to determine the existence of an acceleration condition and provide an interrupt signal to the microprocessor so as to implement providing modified engine control output signals during an acceleration condition. Preferably an external transient detector circuit is utilized to provide an acceleration interrupt signal in order to normally allow the microprocessor time to implement various other control functions during non-acceleration. Otherwise the microprocessor itself would have to substantially constantly monitor an input signal and determine if the instantaneous rate of change of the input signal exceeded a predetermined threshold rate thus indicating an acceleration transient condition. Also external transient detectors can provide for more rapidly detecting a transient condition and providing an interrupt in response thereto, since typically a microprocessor would only periodically monitor an external condition and perform calculations to determine the existence of a transient condition.

In engine microprocessor control systems such as those described above, additional external circuitry would have to be utilized if the microprocessor interrupt control is level rather than edge sensitive. This is because if the microprocessor is level sensitive, the external transient detector must be designed such that it will not continuously provide for interrupting the microprocessor during the entire transient condition. This additional external circuitry must therefore provide a short duration pulse in response to the existence of an acceleration transient which may exist over a substantial time period. An alternative is to use a microprocessor which is edge sensitive rather than level sensitive. The end result is that either the design of the microprocessor engine control system is limited in the choice of available microprocessors or additional external circuitry must be provided at an additional cost.

In addition to the above noted disadvantage, typically prior microprocessor engine control systems which are interrupted in response to an acceleration condition determined by an external transient detector circuit are either subject to error in misinterpreting a long transient which may have a discontinuity therein as two separate transients or these systems would require substantial external additional circuitry so as to compensate the external transient detector for this type of condition. Thus prior engine control systems were either susceptible to misinterpreting a long transient having a discontinuity therein as two separate transients, or they would require substantial additional costly and complex external circuitry in order to prevent this occurrence.

While the above noted problems are discussed with respect to engine control microprocessor transient interrupt systems, the same general disadvantages apply to all prior microprocessor transient interrupt systems which utilize an external transient detector.

SUMMARY OF THE INVENTION

An object of the present invention is to provide an improved and simplified microprocessor transient interrupt system which overcomes the aforementioned disadvantages.

A more specific object of the present invention is to provide an improved engine control microprocessor transient interrupt system which minimizes the cost and complexity of circuitry external to the microprocessor.

In one embodiment of the present invention a microprocessor transient interrupt system is provided comprising: microprocessor means for effectively monitoring at a first rate at least one input signal and providing at least one control output signal in response thereto in accordance with a predetermined main software program which implements a first predetermined relationship between said input and output signals, said microprocessor means including, internal thereto, interrupt means for interrupting said main software program and implementing an interrupt software program in response to receiving an interrupt signal and then reimplementing said main software program; and transient detector means coupled to and located external to said microprocessor means for substantially continuously monitoring a sensed parameter and providing said interrupt signal to said microprocessor means in response to detecting a predetermined change in said parameter indicative of the start of a transient condition of said parameter; said microprocessor means including disable means for, in response to said interrupt program, effectively preventing any additional execution of said interrupt software program after said interrupt program for a time duration calculated by said microprocessor means indicative of the continued existence of said transient condition, whereby said microprocessor prevents additional interrupts by said transient detector means during said time duration.

Essentially, once a transient condition is detected by the external transient detector, and the microprocessor effectively disables the external transient detector, and the microprocessor itself determines the time duration of the transient condition by determining when one of its input signals will change by less than a predetermined amount over a predetermined period of time. The fact that the microprocessor disables the external transient detector in response to the initial interrupt signal provided by the external detector means that the microprocessor can be of either the level or edge sensitive interrupt type. The fact that after an initial interrupt signal is provided by the external detector the microprocessor itself determines the end of the transient condition means that additional complex circuitry is not required in the external transient detector so as to prevent the occurrence of several interrupt signals during one transient and compensate this detector to provide for the proper response to long transients which may have a discontinuity therein. This is because the microprocessor can be programmed to properly calculate the duration of these transients and respond to them. Thus the present invention has avoided the problems of the prior microprocessor interrupt systems which can result from the microprocessor receiving several effective interrupt signals during a single engine transient.

The preferred embodiment of the present invention comprises an engine control microprocessor transient interrupt system in which an acceleration condition of an engine is determined by monitoring engine throttle position and determining when this engine parameter has its rate of change in excess of a predetermined level, since this will result in the external transient detector providing an interrupt signal to an engine control microprocessor. Normally the microprocessor provides engine output control signals in accordance with engine throttle position, whereas during an acceleration condition, in response to the creation of an interrupt signal, the microprocessor now provides engine control signals in accordance with engine throttle position and the rate of change of engine throttle position.

BRIEF DESCRIPTION OF THE DRAWINGS

For a more complete understanding of the invention reference should be made to the drawings, in which.

DESCRIPTION OF THE PREFERRED EMBODIMENTS

Figure 1:
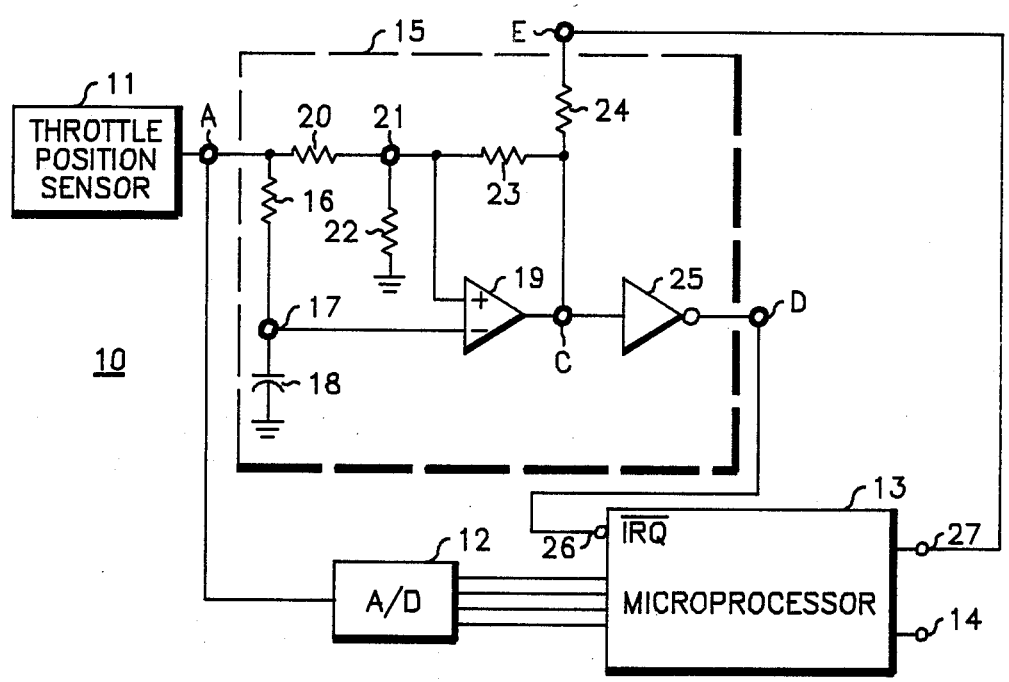
FIG. 1 is a schematic diagram of an engine control microprocessor transient interrupt system according to the present invention.

Referring now to FIG. 1, an engine control microprocessor transient interrupt system 10 is provided. The control system includes an engine throttle position sensor 11 which provides an analog output signal at a terminal A which is representative of engine throttle position. Such sensors are well known and therefore the details of the sensor 11 will not be described. The terminal A is connected as an input to an analog to digital (A/D) converter 12 which provides a digital input corresponding to engine throttle position to an engine control microprocessor 13 that provides one or more engine control signals at an engine control output terminal 14. The microprocessor 13 can comprise any of a number of well known programmable microprocessors which can be utilized to provide desired engine control output signals at terminal 14 in accordance with predetermined relationships relating the digital throttle position signal to the engine control output signals.

The analog engine throttle position signal at the terminal A is also provided as an input to a transient detector 15 located external to the microprocessor 13 and shown dashed in FIG. 1. The transient detector comprises an acceleration detector which substantially continuously monitors the engine throttle position signal, essentially determines the rate of change of engine throttle position, compares the rate of change to a predetermined rate of change threshold and provides an interrupt signal at a terminal D in response to the throttle position rate of change exceeding the predetermined threshold level.

In FIG. 1 a specific embodiment for the transient detector 15 is illustrated. This specific embodiment comprises a resistor 16 connected between the terminal A and a terminal 17 internal to the detector 15. The terminal 17 is connected to ground through a capacitor 18 and connected to the negative input of a DC level comparator 19 which provides its output to a terminal C. A resistor 20 is connected between the terminal A and a terminal 21 internal to the detector 15 wherein the terminal 21 corresponds to the positive input of the comparator 19. The terminal 21 is connected to ground through a resistor 22 and is connected to the terminal C through a resistor 23. The terminal C is connected to an enable terminal E of the detector 15 through a resistor 24, and the terminal C is connected through an inverter 25 to the terminal D. The terminal D is connected as an input to an interrupt terminal 26 of the microprocessor 13 which provides a disable/enable signal at an output terminal 27 which is directly connected to the terminal E.

It should be noted that while a detailed structure for the transient detector 15 is illustrated in FIG. 1, many equivalent structures exist wherein the essential functions comprise receiving a signal at an input terminal, providing a signal related to the rate of change of this input signal, comparing this rate of change signal to a predetermined threshold level to implement a transient detection signal in response to the rate of change exceeding the threshold level, and having the operation of the detector 15 selectively enabled or disabled in response to the signal present at a control terminal corresponding to the terminal E.

The operation of the transient detector 15 can best be explained with reference to the graphs in FIG. 2 wherein the horizontal axes are representative of time and the vertical axes are representative of magnitude. Graph A corresponds to an analog signal 30 at the terminal A representative of engine throttle position, wherein throttle position is first shown at a low level and then undergoes a transient condition until a higher throttle position level is obtained wherein this transient condition corresponds to engine acceleration. It should be noted that the signal 30 is also referred to herein as THR.

Figure 2:
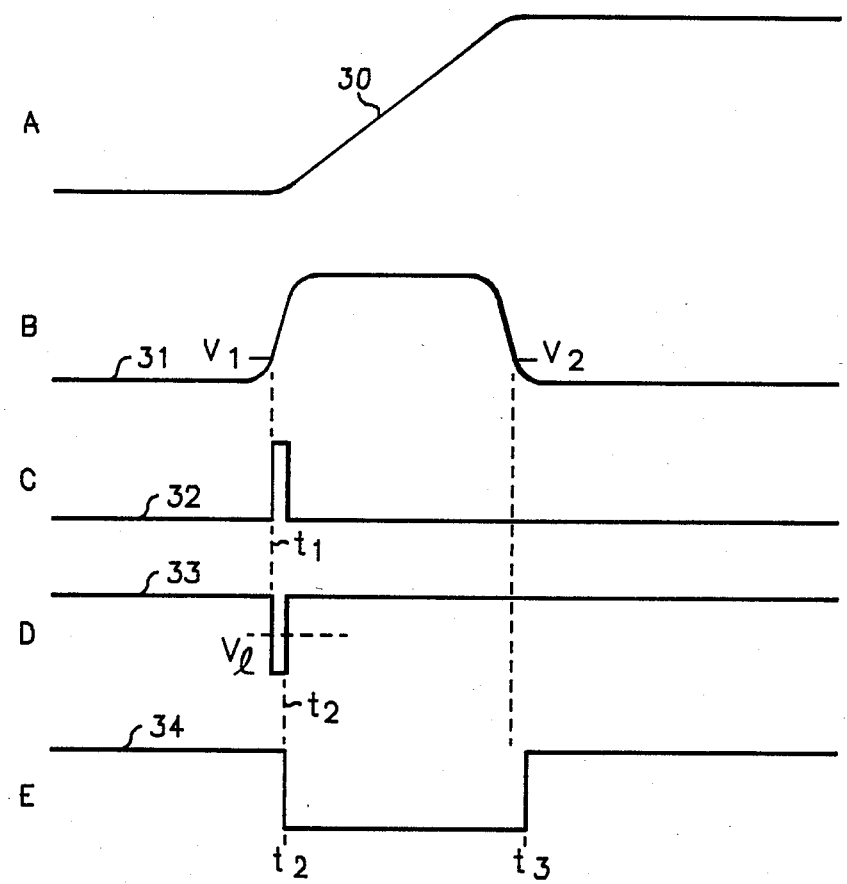
FIG. 2 is a series of graphs illustrating the operation of the system shown in FIG. 1.

A signal 31 is shown in graph B in FIG. 2 and is reprentative of the rate of change of the engine throttle position signal shown in graph A. An initial threshold level $V_1$ is shown in graph B, and a somewhat lower threshold level $V_2$ is also shown wherein the difference between these threshold levels is representative of a slight hysteresis effect caused by the resistor 23. Graph C in FIG. 2 represents a signal 32 present at the terminal C wherein in response to the rate of change signal 31 exceeding the threshold level $V_1$, a high logic state is provided at the terminal C at a time $t_1$. At a subsequent time $t_2$ just after $t_1$ and prior to the actual rate of change falling below the threshold level $V_2$ the signal 33 will be returned to a low logic state and this is due to a disable signal being provided at the terminal E by the microprocessor 13. This is accomplished in the following manner.

In response to the high logic level provided at the terminal C, the inverter 25 will provide a low logic level at the terminal D as represented by the signal 33 in graph D. The magnitude of the low level provided at the terminal D in response to the rate of change exceeding the threshold level $V_1$ is below an interrupt level $V_1$ for the microprocessor 13 which has level sensitive interrupt apparatus internal thereto. In response to the interrupt signal 33 going below the interrupt level $V_1$, the microprocessor 13 will implement an interrupt subroutine which will subsequently, at time $t_2$, result in the production of a low voltage level at the terminal 27 which corresponds to the signal 34 shown in graph E in FIG. 2. This in turn results in effectively disabling the transient detector 15 and thereby terminating the effective operation of the transient detector and causing signal 33 to resume a high level. The transient detector 15 will remain disabled until the microprocessor 13 will itself determine the end of an acceleration transient condition. The manner in which this is accomplished is best explained with reference to the microprocessor flowcharts shown in FIG. 3 which are representative of the operation of the microprocessor 13.

Essentially, the detector 15 responds to an increase in the signal 30 at the terminal A by providing a rapidly increasing signal at the terminal 21 as compared to the slower increasing signal at the terminal 17. The comparator 19 effectively compares these signals and implements an output level change at the terminal C in response to the rate of change of the signal A exceeding the predetermined threshold level $V_1$. At this time a slight hysteresis effect is implemented by the resistor 23 to prevent noise from toggling the output of the comparator 19. All of this occurs when a high signal level is provided at the terminal E. In response to a low signal level provided at this terminal, the entire detector 15 is disabled. In the FIG. 1 embodiment for the detector 15, the predetermined level $V_1$ is effectively a function of the magnitude of the signal 30 at terminal A. A fixed level $V_1$ could also be used, if desired, but use of a variable level allows the detector 15 to be more sensitive to increases of throttle position which occur at low throttle positions corresponding to low engine speeds.

Figure 4:
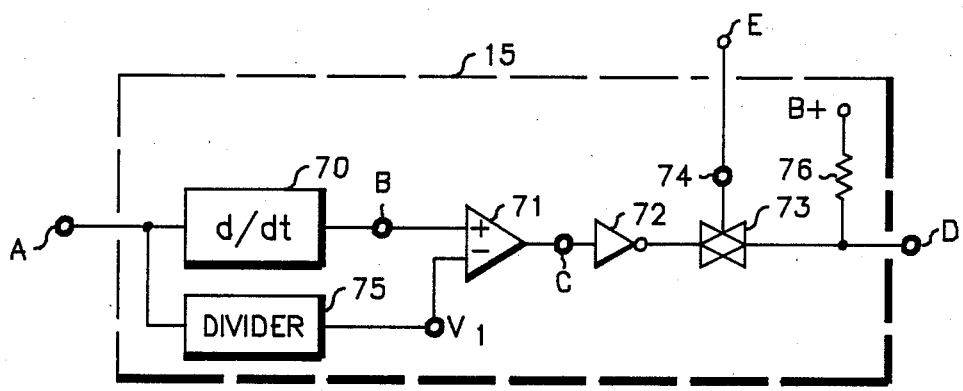
FIG. 4 is a schematic diagram illustrating an alternate configuration for one of the circuits shown in FIG. 1.

It should be noted that the exact construction of the detector 15 is not significant in that the same result can be provided by any equivalent detector circuit such as the circuit 15 shown in FIG. 4. In FIG. 4 a rate of change circuit 70 acts upon the signal 30 to provide the rate of change signal 31 which is provided at a terminal B as an input to a positive input of a comparator 71 which effectively receives another signal level corresponding to the threshold level $V_1$ at a negative input. The comparator 71 provides an output at terminal C and is followed by an inverter 72. The selective enabling and disabling of the detector 15 is implemented by connecting a series controllable gate 73 between the terminals C and D with the voltage level at the terminal E being connected to a control terminal 74 of the series gate. A resistor divider circuit 75 is connected between terminal A and the negative input of comparator 71 to provide the level $V_1$ as a function of signal 30. A resistor 76 connected between a positive terminal B+ and terminal D insures that signal 34 is high when the gate 73 is open. This configuration for detector 15 is substantially equivalent to that shown in FIG. 1.

Figure 3:
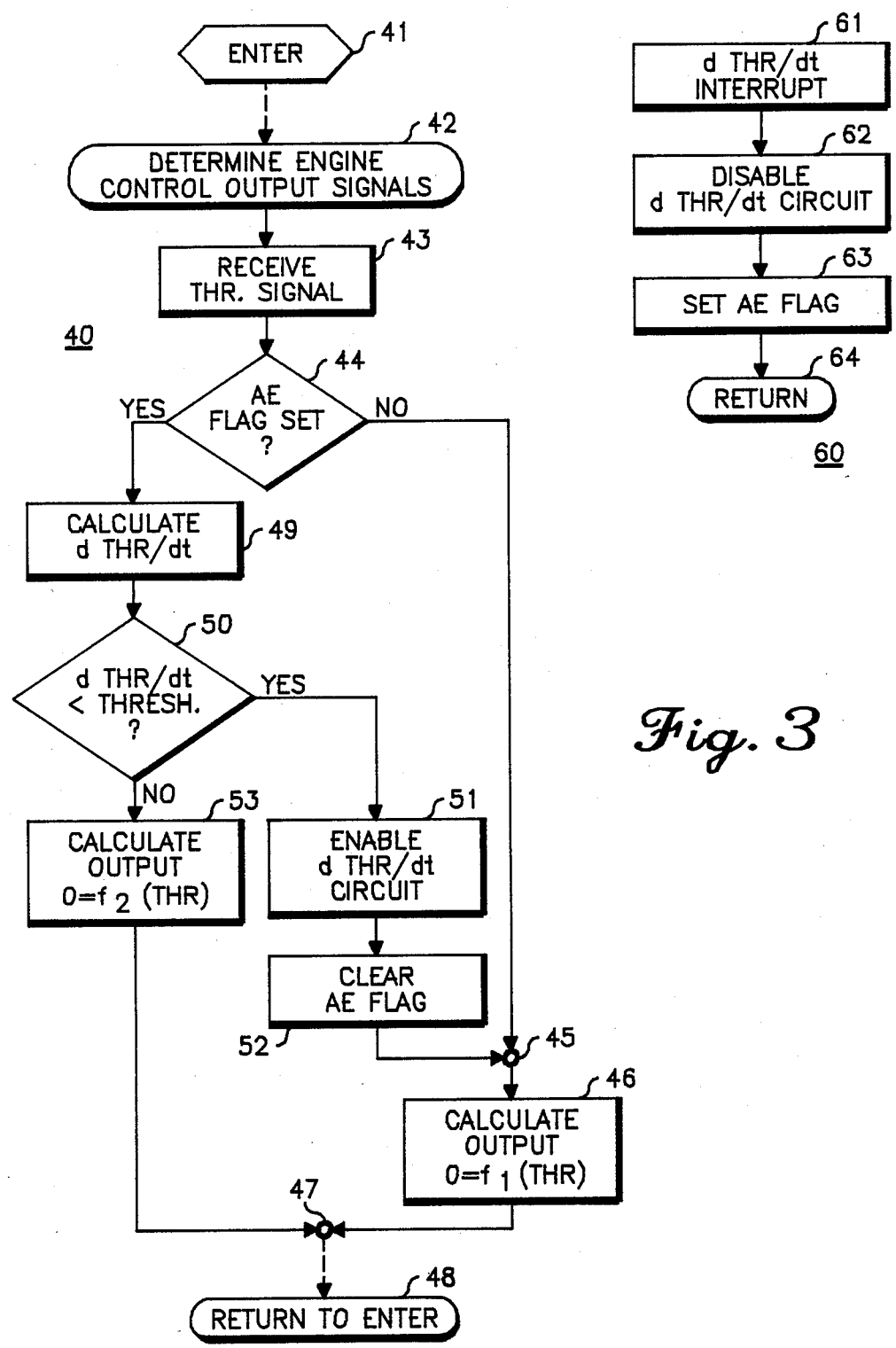
FIG. 3 comprises two simplified flowcharts for a microprocessor which is one of the components shown in FIG. 1.

Referring now to FIG. 3, the operation of the microprocessor 13 will now be discussed with regard to both a main flowchart 40 and an interrupt flowchart 60 shown in FIG. 3. The main flow chart 40 is entered at an entry block 41 wherein control eventually passes to a subroutine 42 which determines engine control output signals. In the subroutine 42 control initially passes to a process block 43 during which the microprocessor 13 receives the digital throttle position signal provided by the A/D converter 12. Control next passes to a decision block 44 which determines if an accelerator enrichment (AE) flag has been set. The AE flag is representative of whether or not an acceleration transient condition is currently present. If the decision block 44 determines that the AE flag is not set indicating no acceleration condition exists, control passes to a summing terminal 45 and from there to a process block 46 which calculates engine output control signals (O) as a first function $f_1$ of engine throttle position (THR). Control then passes to a summing terminal 47, and from there control will eventually pass to a return process block 48.

Essentially, if an acceleration transient is not currently occurring, the main program 40 calculates engine control signals as a first function of engine throttle position, wherein preferably this results in determining engine fuel control signals as a direct function of the magnitude of the engine throttle position signal 30 at the terminal A. Engine microprocessor systems which implement such control are well known, and one such system is illustrated in copending U.S. Pat. application Ser. No. 366,958, filed April 9, 1982, now U.S. Pat. No. 4,490,792 and entitled, "Accelerator Fuel Enrichment System", and assigned to the same assignee as the present invention.

In the event that the decision block 44 determines that the AE flag has been set, control passes to a process block 49 wherein the microprocessor itself will calculate the rate of change of engine throttle position. Since the microprocessor 13 receives a digital signal THR related to engine throttle position from the converter 12, calculating the rate of change of this signal is a function which can readily be implemented by the microprocessor by merely determining the change of the digital input signal over a predetermined period of time.

After the process block 49, control passes to a decision block 50 wherein the determined rate of change of throttle position is now compared to a threshold level. If the rate of change of throttle position is less than this threshold level and if this condition exists for a predetermined period of time, then control passes from the decision block 50 to a process block 51 which enables the external transient detector circuit 15, and then on to a process block 52 which clears the accelerator enrichment flag. From the process block 52 control then passes to the summing terminal 45 which will result in the calculation of the engine control output signals in accordance with the relationship implemented by the process block 46.

Essentially, in response to the rate of change of throttle position, as determined by the microprocessor decision block 50, being less than a threshold level for a predetermined period of time, this indicates that the microprocessor itself has determined that the transient acceleration condition has ended and thus it is now time to re-enable the external transient detector and terminate the acceleration transient flag. If the decision block 50 determines that the rate of change of throttle position is not less than a predetermined threshold level for a predetermined time, then control passes to a process block 53 which calculates the engine control output signals as a second predetermined function $f_2$ of engine throttle position. Preferably the function $f_2$ differs from $f_1$. It is contemplated that the process block 53 will provide engine control signals not only in accordance with the magnitude of the engine throttle position as contemplated by process block 46, but also in accordance with the rate of change of engine throttle position, as determined by the microprocessor, wherein these rate of change control signals are utilized to provide additional fuel and/or air which may be required during an engine acceleration transient. The providing of additional fuel by a microprocessor in response to an acceleration transient is well known and is discussed in the above identified copending U.S. patent application.

After the process block 53, control then passes to the summing terminal 47 and then eventually to the process block 48 which implements a return to the initial block 41 thus signifying a periodic reentry to the engine control output signal determination subroutine 42. This results in the microprocessor effectively monitoring the digital throttle position signal THR at a first rate. During an acceleration condition this may be increased to a higher monitoring rate if desired to get the microprocessor to more rapidly respond to throttle position changes. During a non-acceleration condition the first rate could comprise a single execution of the subroutine 42, since it has been determined that throttle position is not changing, but preferably the first rate causes execution of the subroutine 42 every six milliseconds. The subroutine 42 comprises the controls implemented between the process block 43 and the summing terminal 47.

The operation of the microprocessor 13 in response to the receipt of an interrupt signal at the terminal 26 26 is illustrated by the flowchart 60 shown in FIG. 3. In response to the presence of a low magnitude of the signal at the terminal 26 an initial throttle rate of change interrupt process block 61 of the flowchart 60 is entered asynchronously with regard to the main software program 40. The process block 61 represents characterizing the interrupt mechanism of the microprocessor 13 as being level rather than edge sensitive, since it is the signal level at terminal 26, rather than the occurrence of a signal edge, that implements flowchart 60.

The process block 61 represents the interruption of the main software program 40 which means that the operation of the program 40 is halted during the execution of the interrupt flowchart 60. From the process block 61 control passes to a process block 62 which, by providing a low signal at terminal 27, effectively disables the external transient detector circuit 15 which in essence comprises a throttle position derivative circuit that provides an output in response to the throttle position derivative exceeding a threshold level corresponding to the voltage level $V_1$ in graph B. From the process block 62 control passes to a process block 63 which sets the AE flag which comprises a storage location somewhere within the microprocessor 13. From the process block 63 control is then returned to the main program 40 via a return process block 64.

Essentially, the interrupt flowchart 60 (1) halts the operation of the flowchart 40, (2) disables the external transient detector circuit 15 which detected a rate of change of throttle position in excess of a rate corresponding to the voltage $V_1$, (3) sets an accelerator enrichment flag which is indicative of the existence (duration) of a throttle position acceleration condition, and (4) returns operation of the microprocessor to the main flowchart 40. The end result is that upon the next execution of the subroutine 42 of the main flow chart, the decision block 44 will now result in the microprocessor calculating a rate of change of the throttle position signal and having the microprocessor itself, by decision block 50, determine when the throttle position acceleration transient is terminated. During the acceleration transient fuel control signals are provided in accordance with a different predetermined relationship to throttle position than that which existed prior to the occurrence of the acceleration transient. In response to the microprocessor determining the end of the acceleration transient condition by determining when the throttle position rate of change over a predetermined period of time is less than a threshold level, the external transient detector 15 will be effectively re-enabled thus indicating that the microprocessor 13 has determined the end of the acceleration condition. This is indicated by the signal 34 in FIG. 2 resuming a high output state at a time $t_3$ after a decrease in the rate of change of the throttle position signal 30. The present invention thereby provides for effectively disabling the external transient detector for a time duration ($t_2$ to $t_3$) indicative of an acceleration transient condition wherein the microprocessor 13 includes apparatus for effectively monitoring the throttle position signal during the acceleration transient time duration and effectively re-enabling the external transient detector 15 in response to determining the end of the transient condition.

It should be noted that during the acceleration transient condition the process block 53 implements the providing of control output signals in accordance with a second predetermined relationship, $f_2$, between throttle position and the control output signals whereas at other times the process block 46 implements engine control output signals in accordance with a first predetermined relationship, $f_1$, between engine throttle position and the engine output control signals. In addition, it is understood that the time duration between times $t_1$ and $t_2$ is very short and represents the finite response time of the microprocessor in responding to an interrupt signal and executing process block 62.

Essentially, the present invention, through the use of the microprocessor for disabling the external transient detector in response to being interrupted by the output of the external transient detector, has eliminated the need for additional complex circuitry being added to the external detector so as to determine the proper occurrence of the end of an acceleration transient. The present invention, by effectively disabling the transient detector 15, has prevented the microprocessor from effectively reimplementing the flowchart 60 during the continued existence (duration) of a transient condition as calculated by the microprocessor, wherein this condition corresponds to a set condition of the AE flag which exists after the interrupt program. This beneficial advantage is obtained regardless of whether the microprocessor is edge or level sensitive to interrupt signals at terminal 26. In addition, the present invention is readily adaptable for operation with microprocessors having interrupt circuitry internal thereto which is level rather than edge sensitive, and this occurs because of the disabling of the external transient detector by the microprocessor thus preventing the microprocessor from receiving an interrupt signal continuously during a transient condition.

While the embodiments illustrated herein disable the transient detector 15 by having the microprocessor 13 provide an external disable signal to the detector while the AE flag is set, there is an equivalent mode in which the microprocessor itself can effectively disable the transient detector without providing an external signal at the terminal 27. In this equivalent mode, the process block 61 is defined as entering the flowchart 60 and implementing an interrupt subroutine only in response to interrupt signals at terminal 26 which occur when the AE flag is clear. In this case, the AE flag is then used to effectively prevent any addition execution of the interrupt flowchart 60 during the continued existence of the transient condition as indicated by the set condition of the AE flag which occurred in response to the start of acceleration indicated by the interrupt signal 33. Thus the microprocessor will effectively mask further interrupt signals during the set condition of the AE flag after the interrupt program, wherein the microprocessor determines when the AE flag is cleared.

While I have shown and described specific embodiments of this invention, further modifications and improvements will occur to those skilled in the art. All such modifications which retain the basic underlying principles disclosed and claimed herein are within the scope of this invention.

I claim:

1. A microprocessor transient interrupt system comprising:
   microprocessor means for effectively monitoring at a first rate at least one input signal and providing at least one control output signal in response thereto in accordance with a predetermined main software program which implements a first predetermined relationship between said input and output signals, said microprocessor means including, internal thereto, interrupt means for interrupting said main software program and implementing an interrupt software program in response to receiving an interrupt signal and then reimplementing said main software program; and
   transient detector means coupled to and located external to said microprocessor means for substantially continuously monitoring a sensed parameter and providing said interrupt signal to said microprocessor means in response to detecting a predetermined change in said parameter indicative of the start of a transient condition of said parameter;
   said microprocessor means including disable means for, in response to said interrupt program, effectively preventing any additional execution of said interrupt software program after said interrupt program for a time duration calculated by said microprocessor means indicative of the continued existence of said transient condition, whereby said microprocessor prevents additional interrupts by said transient detector means during said time duration.

2. A microprocessor interrupt system according to claim 1 wherein said microprocessor means includes means for effectively reenabling execution of said interrupt program in response to determining the end of said transient condition by determining said input signal changes by less than a predetermined amount over a predetermined period of time, thus indicating the end of a transient condition for the parameter.

3. A microprocessor interrupt system according to claim 2 wherein said microprocessor means includes means for monitoring said input signal during said time duration and providing said output signal in accordance with a second predetermined relationship between said input and output signals.

4. A microprocessor interrupt system according to claim 3 wherein said second relationship is different from said first relationship.

5. A microprocessor interrupt system according to claim 4 wherein said microprocessor means includes means for reimplementing said first relationship between said input and output signals in response to said determining the end of said transient condition.

6. A microprocessor interrupt system according to claim 2 wherein said input signal is related to and determined by at least said parameter.

7. A microprocessor interrupt system according to claim 1 wherein said transient detector means includes means for providing said interrupt signal by comparing the rate of change of said parameter with at least one predetermined rate of change threshold.

8. A microprocessor interrupt system according to claim 7 wherein said input signal is related to and determined by said parameter, said transient detector means monitoring said parameter by monitoring said input signal.

9. A microprocessor interrupt system according to claim 1 wherein said microprocessor interrupt means implements said interrupt software program in response to being level sensitive to the magnitude of said interrupt signal rather than being edge sensitive to said interrupt signal.

10. A microprocessor interrupt system according to claim 1 wherein said transient detector means is disabled in response to receipt of a disable signal, and wherein said microprocessor disable means selectively provides said disable signal to said transient detector means during said time duration.

11. An engine control microprocessor transient interrupt system comprising:
   sensor means for providing an input signal related to throttle position of an engine;
   microprocessor means coupled to said sensor means for effectively monitoring at a first rate at least said input signal and providing at least one engine control output signal in response thereto in accordance with a predetermined main software program which implements a first predetermined relationship between said input and output signals, said microprocessor means including, internal thereto, interrupt means for interrupting said main software program and implementing an interrupt software program in response to receiving an interrupt signal and then reimplementing said main software program; and
   transient detector means coupled to and located external to said microprocessor means for substantially continuously monitoring a sensed engine parameter and providing said interrupt signal to said microprocessor means in response to detecting a predetermined change in said parameter indicative of the start of a transient condition of said parameter;
   said microprocessor means including disable means for, in response to said interrupt program, effectively preventing any additional execution of said interrupt software program after said interrupt program for a time duration calculated by said microprocessor means indicative of the continued existence of said transient engine condition, whereby said microprocessor prevents additional interrupts by said transient detector means during said time duration.

12. A microprocessor interrupt system according to claim 11 wherein said microprocessor means includes means for effectively reenabling execution of said interrupt program in response to determining the end of said transient condition by determining said input signal changes by less than a predetermined amount over a predetermined period of time, thus indicating the end of a transient condition for the parameter.

13. A microprocessor interrupt system according to claim 12 wherein said microprocessor means includes means for monitoring said input signal during said time duration and providing said output signal in accordance with a second predetermined relationship between said input and output signals.

14. A microprocessor interrupt system according to claim 13 wherein said second relationship is different from said first relationship.

15. A microprocessor interrupt system according to claim 14 wherein said microprocessor means includes means for reimplementing said first relationship between said input and output signals in response to said determining the end of said transient condition.

16. A microprocessor interrupt system according to claim 12 wherein said sensed engine parameter is related to and determined by at least engine throttle position.

17. A microprocessor interrupt system according to claim 11 wherein said transient detector means includes means for providing said interrupt signal by comparing the rate of change of said engine parameter with at least one predetermined rate of change threshold.

18. A microprocessor interrupt system according to claim 17 wherein said engine parameter is related to and determined by engine throttle position, said transient detector means monitoring said parameter by monitoring said input signal provided to said microprocessor.

19. A microprocessor interrupt system according to claim 11 wherein said microprocessor interrupt means implements said interrupt software program in response to being level sensitive to the magnitude of said interrupt signal rather than being edge sensitive to said interrupt signal.

20. A microprocessor interrupt system according to claim 11 wherein said transient detector means is disabled in response to receipt of a disable signal, and wherein said microprocessor disable means selectively provides said disable signal to said transient detector means during said time duration.

* * * * *